United States Patent
Takemura

(10) Patent No.: US 9,897,956 B2
(45) Date of Patent: Feb. 20, 2018

(54) IMAGE FORMING APPARATUS

(71) Applicant: CANON KABUSHIKI KAISHA, Tokyo (JP)

(72) Inventor: Taichi Takemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/492,352

(22) Filed: Apr. 20, 2017

(65) Prior Publication Data

US 2017/0315486 A1 Nov. 2, 2017

(30) Foreign Application Priority Data

Apr. 28, 2016 (JP) .................... 2016-091212

(51) Int. Cl.
*G03G 15/00* (2006.01)

(52) U.S. Cl.
CPC .................. *G03G 15/50* (2013.01)

(58) Field of Classification Search
CPC ........... G03G 15/5058; G03G 15/5041; G03G 15/08; G03G 15/5062; G03G 15/55; G03G 9/08797; G03G 15/0189; G03G 15/1675; G03G 15/556; G03G 2215/0164; G03G 9/0806; G03G 9/08795; G03G 9/09725; G03G 13/08
See application file for complete search history.

(56) References Cited

U.S. PATENT DOCUMENTS

| 6,178,007 | B1 | 1/2001 | Harrington |
| 6,418,281 | B1 | 7/2002 | Ohki |
| 2013/0194416 | A1* | 8/2013 | Kutcka ................. G03B 21/11 348/104 |
| 2016/0286091 | A1* | 9/2016 | Negishi .................. G03G 15/01 |

FOREIGN PATENT DOCUMENTS

| JP | 08-98043 A | 4/1996 |
| JP | 2005-103850 A | 4/2005 |

* cited by examiner

*Primary Examiner* — Roy Y Yi
(74) *Attorney, Agent, or Firm* — Fitzpatrick, Cella, Harper & Scinto

(57) ABSTRACT

An image forming apparatus includes a converting unit configured to convert image data based on a conversion condition; an image forming unit; a measurement unit; and a controller configured to control the image forming unit to form a plurality of measurement images including a first measurement image and a second measurement image. The controller obtains first output characteristics based on a current measurement result of the first measurement image and a previous measurement result of the second measurement image to generate the conversion condition, and the controller obtains second output characteristics based on a current measurement result of the second measurement image and a previous measurement result of the first measurement image to generate the conversion condition.

7 Claims, 14 Drawing Sheets

IMAGE FORMING APPARATUS

BACKGROUND OF THE INVENTION

Field of the Invention

The present invention relates to an image forming apparatus.

Description of the Related Art

In an image forming apparatus, due to the influence of a short-term variation caused by a variation of an environment in which the image forming apparatus is installed or a variation of an environment in the image forming apparatus and a long-term variation caused by a change with time (deterioration with time) of a photosensitive member and developer, the density and density gradation characteristics of an output image may be different from a desired density and density gradation characteristics. In view of the foregoing, in the image forming apparatus, it is necessary to correct an image forming condition as needed in consideration of various variations in order to match the density and density gradation characteristics of an output image with the desired density and density gradation characteristics.

Processing of appropriately correcting changes in density and hue involves forming, for example, a pattern image having a uniform density on a sheet, a photosensitive member, or an intermediate transfer member, measuring the density of the pattern image with a sensor, and adjusting an image forming condition for forming an image based on the density of the pattern image and a target density.

An image forming apparatus described in U.S. Pat. No. 6,418,281 is configured to form a pattern image on a sheet and control an image forming condition based on information read by an image reading portion. The density of an output image formed by the image forming apparatus described in U.S. Pat. No. 6,418,281 is stable.

Further, it has been proposed that, in order to maintain color reproducibility at a constant level in one image forming job, calibration be performed in the middle of the image forming job. For example, in U.S. Pat. No. 6,178,007, there is proposed that a pattern image be formed during the image forming job and a look-up table for adjusting the level of an output image signal be renewed based on the density of the pattern image.

In the above-mentioned related art, calibration is performed at arbitrary timing or at periodic or quantitative timing. However, an image immediately after the calibration operation is performed to change an image forming condition necessarily changes in density and hue significantly as compared to those of an image immediately before the calibration operation is performed to change an image forming condition.

In Japanese Patent Application Laid-Open No. H8-98043, in order to suppress such abrupt changes in density and hue, there is proposed a method involving, when the characteristics of a look-up table selected based on calibration measurement results are significantly different from those of a current look-up table, gradually changing density characteristics through a look-up table having intermediate characteristics between the selected look-up table and the current look-up table.

Further, in a proposal of Japanese Patent Application Laid-Open No. 2005-103850, the density or color tint value of an image at a time of start of an image forming job is stored as a target value in a job, and calibration is performed in an attempt to attain the target value in a job during the image forming job. Therefore, as compared to the case where calibration is performed during the image forming job in an attempt to attain a previously fixed target value, variations of the density or hue of the image during the image forming job can be suppressed within an appropriate range.

Meanwhile, in recent years, due to an increasing demand for environmental friendliness and reducing cost, a technology of reducing the amount of toner consumption is becoming very important. The above-mentioned calibration technology uses a toner in a calibration pattern, and hence there is a demand for a technology of performing high-accuracy calibration while minimizing the amount of toner consumption.

However, the calibration procedure for hue and density gradation characteristics stabilization control in the related art have the following problem.

Specifically, in the procedure proposed hitherto in order to prevent abrupt changes in hue and density before and after calibration, a plurality of pieces of previously determined gradation pattern data required for understanding gradation characteristics of an engine in operation are obtained, and feedback is given to an image forming condition after a look-up table is generated based on the measurement value. Therefore, there is a problem in that the amount of a toner to be used by the time when the feedback is given increases.

SUMMARY OF THE INVENTION

According to one embodiment of the present invention, there is provided an image forming apparatus, comprising:

a converting unit configured to convert image data based on a conversion condition;

an image forming unit configured to form an image based on the converted image data;

a measurement unit configured to measure a plurality of measurement images which are formed by the image forming unit based on measurement image data; and a controller configured to control the image forming unit to form the plurality of measurement images, control the measurement unit to measure the plurality of measurement images, obtain output characteristics of the image forming unit based on measurement results of the plurality of measurement images, and generate the conversion condition based on the output characteristics, wherein the plurality of measurement images include a first measurement image and a second measurement image different from the first measurement image, wherein the controller controls the image forming unit to form the first measurement image again, controls the measurement unit to measure the first measurement image, obtains first output characteristics based on a current measurement result of the first measurement image and a previous measurement result of the second measurement image, and generates the conversion condition based on the first output characteristics, and wherein the controller controls the image forming unit to form the second measurement image again, controls the measurement unit to measure the second measurement image, obtains second output characteristics based on a current measurement result of the second measurement image and a previous measurement result of the first measurement image, and generates the conversion condition based on the second output characteristics.

Further features of the present invention will become apparent from the following description of exemplary embodiments with reference to the attached drawings.

DESCRIPTION OF THE EMBODIMENTS

Next, embodiments of the present invention will be described with reference to the drawings. In those embodiments, a method of solving the above-mentioned problem will be described through use of an electrophotographic laser beam printer. The following description will be provided of an electrophotographic printer, but the features of control, in particular, the matters described in the appended claims may solve the same problem, which occurs in an ink jet printer, a sublimation type printer, and the like, through use of the method described below. Thus, the image forming apparatus encompasses a laser beam printer, an ink jet printer, and a sublimation type printer.

<Description of System Configuration>

First Embodiment

<Image Forming Apparatus>

Figure 1:
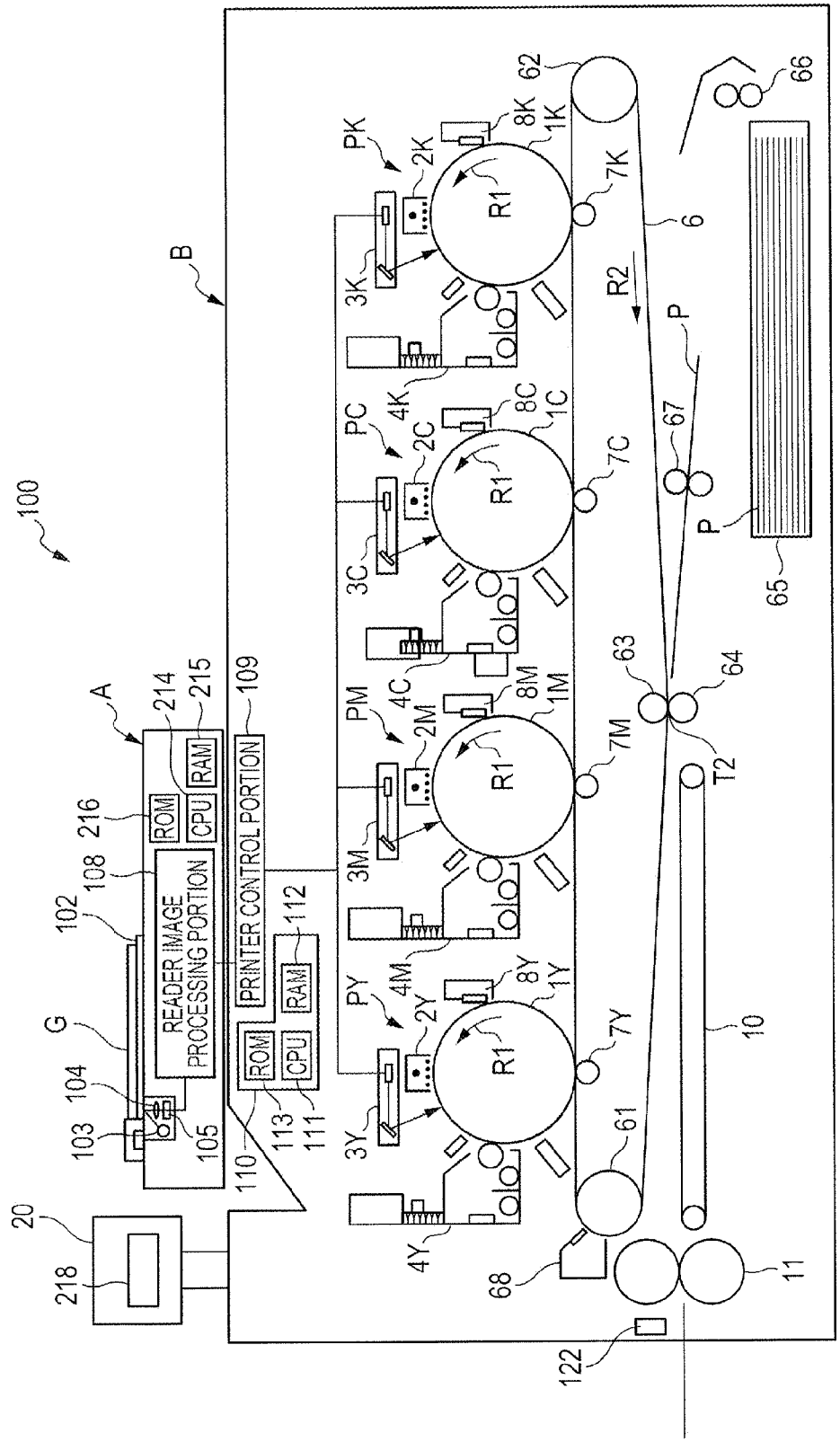
FIG. 1 is a view for illustrating a configuration of an image forming apparatus.

FIG. 1 is a view for illustrating a configuration of an image forming apparatus according to a first embodiment of the present invention. An image forming apparatus 100 is a full-color printer of a tandem-type intermediate transfer system in which image forming portions PY, PM, PC, and PK of yellow (Y), magenta (M), cyan (C), and black (K) are arranged along an intermediate transfer belt 6.

The image forming portion PY is configured to form a yellow toner image on a photosensitive drum 1Y. The yellow toner image is transferred onto the intermediate transfer belt 6. An image forming portion PM is configured to form a magenta toner image on a photosensitive drum 1M. The magenta toner image is transferred onto the intermediate transfer belt 6 so as to be superimposed onto the yellow toner image on the intermediate transfer belt 6. An image forming portion PC is configured to form a cyan toner image on a photosensitive drum 1C. An image forming portion PK is configured to form a black toner image on a photosensitive drum 1K. The cyan toner image and the black toner image are similarly transferred onto the intermediate transfer belt 6 so as to be successively superimposed one on another.

The toner images transferred onto the intermediate transfer belt 6 are conveyed to a secondary transfer portion T2 and collectively transferred onto a recording medium P (hereinafter referred to as "sheet"). The sheet P having the toner images on the intermediate transfer belt 6 transferred thereon is conveyed to a fixing device 11 by a conveyor belt 10. The sheet P is heated and pressurized in the fixing device 11, with the result that the toner images are fixed onto the surface of the sheet P. After that, the sheet P having the toner images fixed thereon is delivered outside of the apparatus.

The intermediate transfer belt 6 is supported by being wound around a tension roller 61, a drive roller 62, and a counter roller 63, and is driven by the drive roller 62 to rotate in a direction of an arrow R2 at a predetermined process speed.

The sheets P fed from a sheet cassette 65 are separated one by one in separation rollers 66 and sent to registration rollers 67. The registration rollers 67 receive the sheet P under a stationary state to cause the sheet P to stand by. Then, the registration rollers 67 convey the sheet P to the secondary transfer portion T2 with the timing being adjusted to the toner images on the intermediate transfer belt 6.

A secondary transfer roller 64 is configured to be brought into abutment against the intermediate transfer belt 6 supported by the counter roller 63, to thereby form the secondary transfer portion T2. A positive DC voltage is applied to the secondary transfer roller 64. With this, the toner images that are negatively charged and carried on the intermediate transfer belt 6 are transferred onto the sheet P.

The image forming portions PY, PM, PC, and PK have substantially the same configuration except that the colors of toners in developing devices 4Y, 4M, 4C, and 4K are different, that is, yellow, magenta, cyan, and black. Unless otherwise required to be discriminated, description is made below with suffixes Y, M, C, and K being omitted.

The image forming portions PY, PM, PC, and PK each have a configuration in which a charging device 2, an exposure device 3, the developing device 4, a primary transfer roller 7, and a cleaning device 8 are arranged around the photosensitive drum 1.

The photosensitive drum 1 has a photosensitive layer having a negative charging polarity formed on an outer peripheral surface of an aluminum cylinder. The photosensitive drum 1 rotates in a direction of an arrow R1 at a predetermined process speed. The photosensitive drum 1 is an OPC photosensitive member having a reflectance of about 40% of near-infrared light (960 nm). However, the photosensitive drum 1 may also be an amorphous silicon-based photosensitive member having a similar reflectance.

The charging device 2 includes a scorotron charger and is configured to irradiate the photosensitive drum 1 with charged particles involved in corona discharge, to thereby charge the surface of the photosensitive drum 1 with a uniform negative potential. The scorotron charger includes a wire to which a high voltage is applied, a shield portion connected to the earth, and a grid portion having a desired voltage applied thereto. A predetermined charging bias is applied to the wire of the charging device 2 from a charging bias power source (not shown). A predetermined grid bias is applied to the grid portion of the charging device 2 from a grid bias power source (not shown). Although depending also on the voltage applied to the wire, the photosensitive drum 1 is substantially charged with the voltage applied to the grid portion.

The exposure device 3 is configured to cause a rotary mirror to deflect a laser beam, to thereby form an electrostatic image of an image on the charged surface of the photosensitive drum 1. A potential sensor 5 is configured to detect a potential of the electrostatic image formed on the photosensitive drum 1 by the exposure device 3. The developing device 4 is configured to cause a toner to adhere to the electrostatic image on the photosensitive drum 1, to thereby develop a toner image.

The primary transfer roller 7 is configured to press an inner side surface of the intermediate transfer belt 6 to form a primary transfer portion T1 (FIG. 2) between the photosensitive drum 1 and the intermediate transfer belt 6. When a positive DC voltage is applied to the primary transfer roller 7, the negative toner image carried on the photosensitive drum 1 is primarily transferred onto the intermediate transfer belt 6 that passes through the primary transfer portion T1.

The cleaning device 8 includes a cleaning blade configured to rub against the photosensitive drum 1. The cleaning blade of the cleaning device 8 is configured to remove a residual toner that remains on the photosensitive drum 1 without being transferred onto the intermediate transfer belt 6.

A belt cleaning device 68 includes a cleaning blade configured to rub against the intermediate transfer belt 6. The cleaning blade of the belt cleaning device 68 is configured to remove a residual toner that remains on the intermediate transfer belt 6 without being transferred onto the sheet P.

The image forming apparatus 100 includes an operation portion 20. The operation portion 20 includes a display unit 218. The operation portion 20 is connected to a CPU 214 of an image reading portion A and a main controller 110 of the image forming apparatus 100. A user inputs the kind of an image and the number of sheets to be printed through the operation portion 20. A printer portion B is configured to form an image in accordance with the kind of an image and the number of sheets to be printed. The CPU 214 of the image reading portion A is configured to read a control program stored in a ROM 216 onto a RAM 215, to thereby control reading processing. A reader image processing portion 108 is configured to obtain a density signal from results that are read by an image sensor 105 through a lens 104 from reflected light of light radiated to an original from a light source 103 and subject the density signal to image processing. The operation portion 20 includes a reading button. An automatic original conveying device G is formed integrally with an original pressure plate 102.

<Exposure Device>

Figure 2:
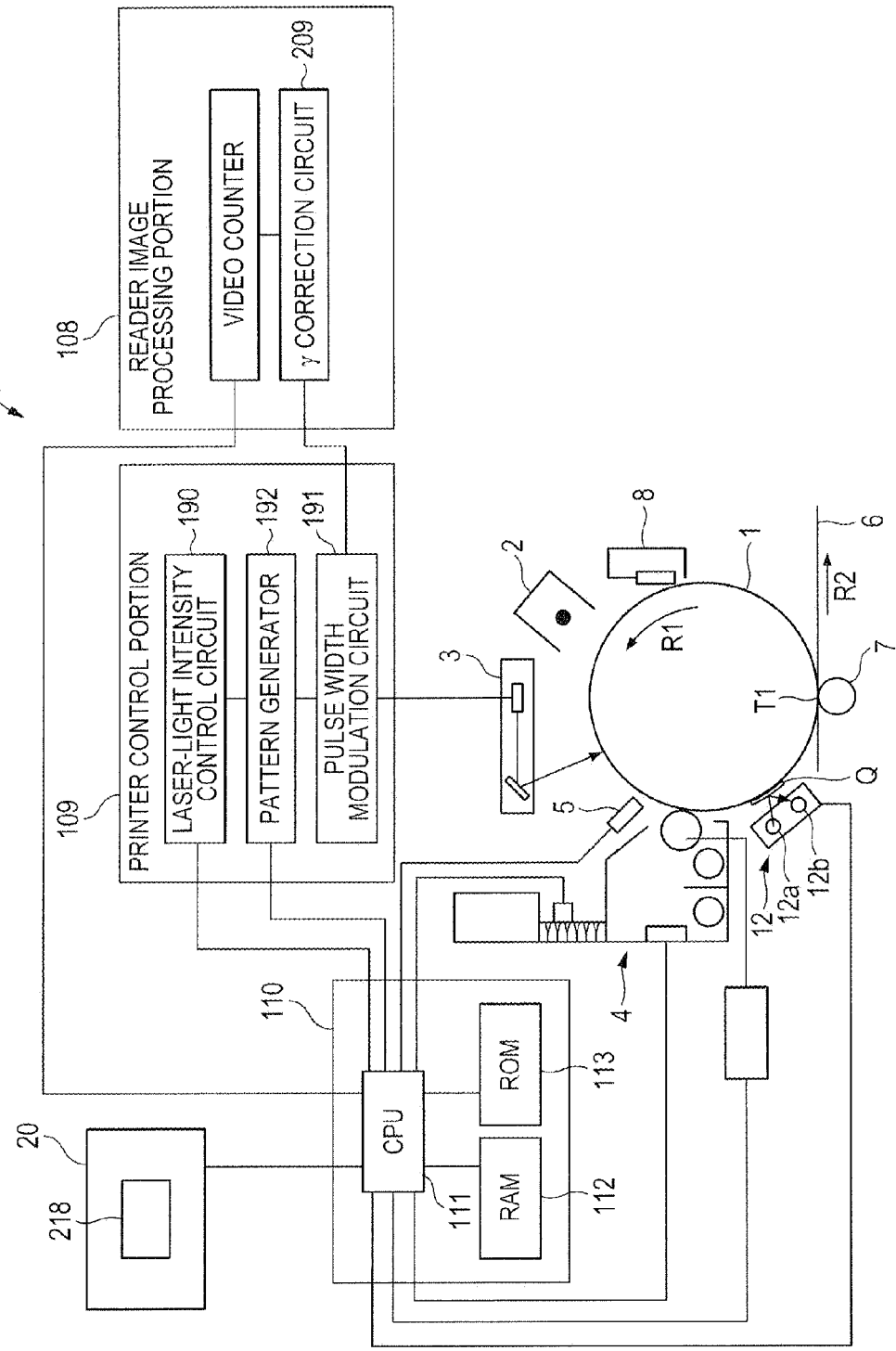
FIG. 2 is a block diagram of a control system of the image forming portion.

FIG. 2 is a control block diagram of each of the image forming portions PY, PM, PC, and PK illustrated in FIG. 1.

The same components as those of FIG. 1 are denoted by the same reference symbols as those therein.

In FIG. 2, the image forming apparatus 100 includes the main controller 110 configured to control an image forming operation in an integrated manner. The main controller 110 includes a CPU 111, a RAM 112, and a ROM 113.

The exposure device 3 includes a laser scanner having the rotary mirror. The exposure output of the exposure device 3 is controlled by a laser light intensity control circuit 190 so that a desired image density level is obtained with respect to a laser output signal. Further, a pulse width modulation circuit 191 is configured to determine a pulse width based on a drive signal generated through a gradation correction table (LUT) of a γ correction circuit 209. Laser light is controlled based on a binary signal output from the pulse width modulation circuit 191. The image forming apparatus 100 is configured to form one pattern image in a sheet-to-sheet interval area and generate the gradation correction table (LUT) suitable for γ characteristics of the photosensitive drum 1 based on results obtained by an image density sensor 12 through detection of the pattern image.

Further, the image forming apparatus 100 is configured to obtain the relationship between a laser output signal and an image density level and store the laser output signal capable of forming a desired image density in the γ correction circuit 209 as the gradation correction table (LUT). The image forming apparatus 100 is configured to determine the laser output signal corresponding to the image density level based on the gradation correction table (LUT).

A printing job transferred to the image forming apparatus 100 or an input image signal corresponding to an image read by the image reading portion A is transferred to a printer control portion 109. The exposure device 3 is configured to record an image having density gradation through binary area gradation using pulse width modulation (PWM).

That is, the pulse width modulation circuit 191 of the printer control portion 109 is configured to output a laser drive pulse having a width (time width) corresponding to a signal level for each input pixel image signal. The pulse width modulation circuit 191 is configured to output a drive pulse having a larger width with respect to a pixel image signal having a high density (high level), output a drive pulse having a smaller width with respect to a pixel image signal having a low density (low level), and output a drive pulse having an intermediate width with respect to a pixel image signal having an intermediate density.

The binary laser drive pulse output from the pulse width modulation circuit 191 is supplied to a semiconductor laser of the exposure device 3. The semiconductor laser is configured to emit light for a time period corresponding to the pulse width based on the laser drive pulse. Thus, the semiconductor laser is configured to emit light for a longer time period with respect to a high-density pixel and emit light for a shorter time period with respect to a low-density pixel.

Therefore, the dot size (area) of the electrostatic image formed on the photosensitive drum 1 is formed so as to be different in accordance with the density of a pixel. The exposure device 3 is configured to expose the high-density pixel to light within a longer range in a main scanning direction and expose the low-density pixel to light within a shorter range in the main scanning direction.

<Image Density Sensor>

The image density sensor 12 is configured to read a pattern image formed in a sheet-to-sheet interval area in a state in which images are continuously formed on a plurality of sheets. The configuration in which the image density sensor 12 is arranged so as to be opposed to the photosensitive drum 1 will be described. However, the image density sensor 12 may also be arranged so as to detect a pattern image formed on the intermediate transfer belt 6.

Further, the image density sensor 12 arranged so as to be opposed to the photosensitive drum 1 or the intermediate transfer belt 6 is a sensor configured to measure the density of an unfixed pattern image. However, the image density sensor 12 configured to measure a fixed pattern image may also be arranged on the downstream side of the fixing device 11 in a direction in which a sheet is conveyed. For example, a color sensor 122 illustrated in FIG. 1 is an example of the image density sensor configured to detect a pattern image. Thus, the image density sensor 12 is not limited to the image density sensor described below.

The image density sensor 12 is arranged so as to be opposed to the photosensitive drum 1 on the downstream side of the developing device 4 in a direction in which the photosensitive drum 1 rotates (direction of the arrow R1). The image density sensor 12 is configured to detect the density of a pattern image Q formed on the photosensitive drum 1. The image density sensor 12 includes a light emitting portion 12a including a light emitting element, for example, an LED and a light receiving portion 12b including a light receiving element, for example, a photodiode (PD), and the light receiving portion 12b is configured to detect only specularly reflected light from the photosensitive drum 1.

The image density sensor 12 is configured to turn on the light emitting portion 12a so as to irradiate the photosensitive drum 1 with light in accordance with the timing at which the pattern image Q formed in the sheet-to-sheet interval area passes through a portion below the image density sensor 12 in a state in which an image is continuously formed on a plurality of sheets. The light reflected from the photosensitive drum 1 (pattern image Q) is received by the light receiving portion 12b. The image density sensor 12 is configured to measure the amount of reflected light from the photosensitive drum 1 (pattern image Q). A density signal corresponding to the measurement result is converted into a digital signal, and the digital signal is input to the CPU 111 and stored in the RAM 112. After that, the density signal stored in the RAM 112 is read by the CPU 111 in gradation correction processing described later and used for correction processing for the gradation correction table (LUT).

Figure 3:
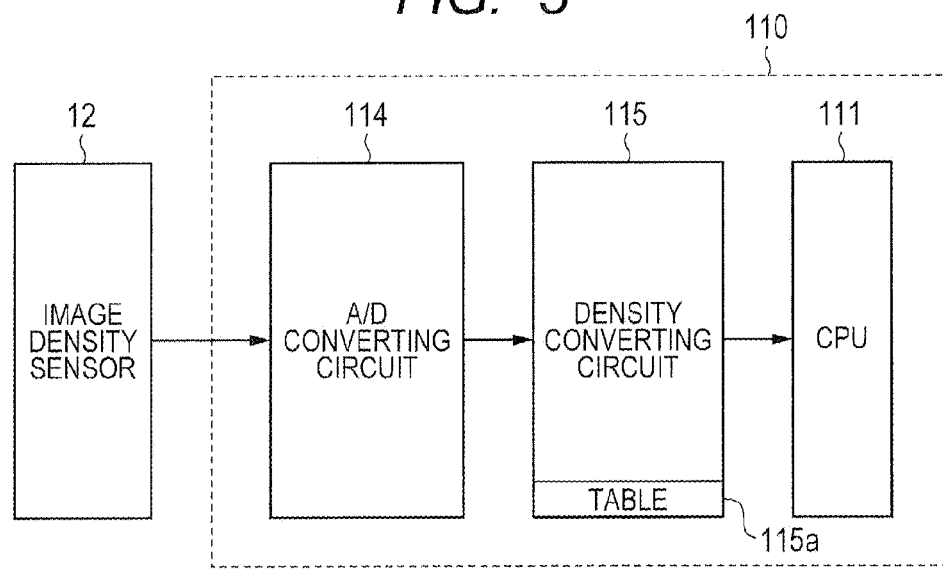
FIG. 3 is a block diagram for illustrating a configuration of a main controller illustrated in FIG. 2.

FIG. 3 is a block diagram for illustrating a configuration of the main controller 110 illustrated in FIG. 2.

The image density sensor 12 is configured to output an analog electric signal of from 0 V to 5 V based on the light reception result of the reflected light (near-infrared light) from the photosensitive drum 1 (pattern image Q). Then, the analog electric signal is converted into an 8-bit digital signal by an A/D converting circuit 114. Then, the digital signal is converted into density information by a density converting circuit 115. The density converting circuit 115 includes a table 115a for converting the digital signal into the density information in density converting processing.

When the image density of the pattern image Q (including five pattern images described later) formed on the photosensitive drum 1 is changed in stages through area gradation, the output of the image density sensor 12 changes in accordance with the density of the pattern image. In this case, the output of the image density sensor 12 in a state in which a toner has not adhered to the photosensitive drum 1 is 5 V and is converted into a digital signal at a 255 level in the A/D converting circuit 114.

Figure 4:
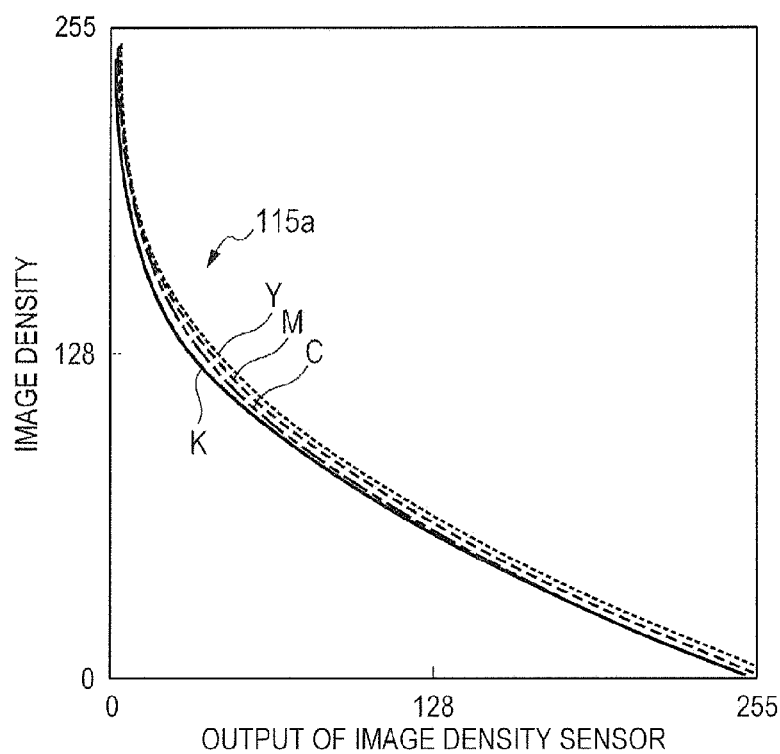
FIG. 4 is a characteristic graph for showing an operation of the image forming apparatus.

As the area coverage ratio of a toner in a pixel formed on the photosensitive drum 1 increases to increase the image density, the output of the image density sensor 12 decreases. That is, the output of the image density sensor 12 becomes lower than 5 V. The image forming apparatus 100 is configured to store in advance the table 115a for each color (FIG. 4) in order to obtain density information of each color from the output of the image density sensor 12 in consideration of the characteristics of the image density sensor 12. The table 115a is stored in a storage portion of the density converting circuit 115. With this, the density converting circuit 115 can detect density information of the pattern image with good accuracy with respect to each color. The density converting circuit 115 is configured to transfer the density information to the CPU 111.

<Pattern Image>

The calibration function of the image forming apparatus 100 involves generating an initial value of the gradation correction table (LUT) and correcting gradation characteristics in parallel with general image formation. Now, the processing of forming an image while suppressing the variation of gradation characteristics of the image forming apparatus 100 even when an image is continuously formed is described in detail.

The main controller 110 is configured to form one pattern image Q for each color between an output image and a subsequent output image formed after the output image (in a sheet-to-sheet interval area) during continuous image formation. The image density correction in, for example, a cyan color will be described below, but the similar processing is performed in the other colors.

The image forming apparatus 100 is configured to generate a plurality of pattern images required for generating a look-up table (LUT) for gradation correction described later so that the plurality of pattern images are divided between different sheets while an image is continuously formed on a plurality of sheets.

The main controller 110 is configured to form a "pattern electrostatic image" serving as an electrostatic image of the pattern image on the photosensitive drum 1 by controlling the exposure device 3 and develop the pattern electrostatic image by the developing device 4 to form a pattern image.

The main controller 110 is configured to execute image density control to cause the image density sensor 12 to detect the pattern image and execute the control so that the image density of the pattern image reaches a reference density based on the detection result.

As illustrated in FIG. 2, the printer control portion 109 includes a pattern generator 192. The pattern generator 192 is configured to generate a pattern image signal. The pattern image signal includes a signal level corresponding to a previously determined image density. The printer control portion 109 is configured to supply the pattern image signal output from the pattern generator 192 to the pulse width modulation circuit 191, to thereby generate a laser drive pulse. The printer control portion 109 is configured to supply the laser drive pulse to the semiconductor laser of the exposure device 3 and cause the semiconductor laser to emit light for a time period corresponding to the pulse width to subject the photosensitive drum 1 to scanning exposure. With this, the pattern electrostatic image corresponding to the previously determined density is formed on the photosensitive drum 1. The pattern electrostatic image is developed by the developing device 4. The pattern image is formed so that the density increases from a low density to a high density. In this case, the previously determined density includes, for example, five densities, that is, 30h, 60h, 90h, C0h, and FFh. When the pattern image is formed so that the density decreases from a high density to a low density, the predetermined density includes, for example, five densities, that is, FFh, C0h, 90h, 60h, and 30h.

The image forming apparatus 100 includes the image density sensor 12 on each photosensitive drum 1. The image forming apparatus 100 is configured to form a pattern image (measurement image) on each photosensitive drum 1 and generate a look-up table (LUT) based on the measurement result of the pattern image while an image is continuously formed on a plurality of sheets. Specifically, a yellow LUT is generated based on the measurement results of a plurality of yellow pattern images (measurement images), and a magenta LUT is generated based on the measurement results of a plurality of magenta pattern images (measurement images). A cyan LUT is generated based on the measurement results of a plurality of cyan pattern images (measurement images). A black LUT is generated based on the measurement results of a plurality of black pattern images (measurement images).

When the pattern image (measurement image) is formed on an intermediate transfer member, a measurement image is formed so that the density is arranged, for example, in the following order: Y30h→M30h→C30h→K30h→Y90h→M90h→C90h→K90h→YFFh→MFFh→CFFh→KFFh→Y60h→M60h→C60h→K60h→YC0h→MC0h→CC0h→KC0h→. The density returns to Y30h after the pattern image of KC0h is formed, and the foregoing is repeated.

<Gradation Correction Method>

First, a method of obtaining a density target required for the image forming apparatus 100 to perform image density control will be described.

Figure 5:
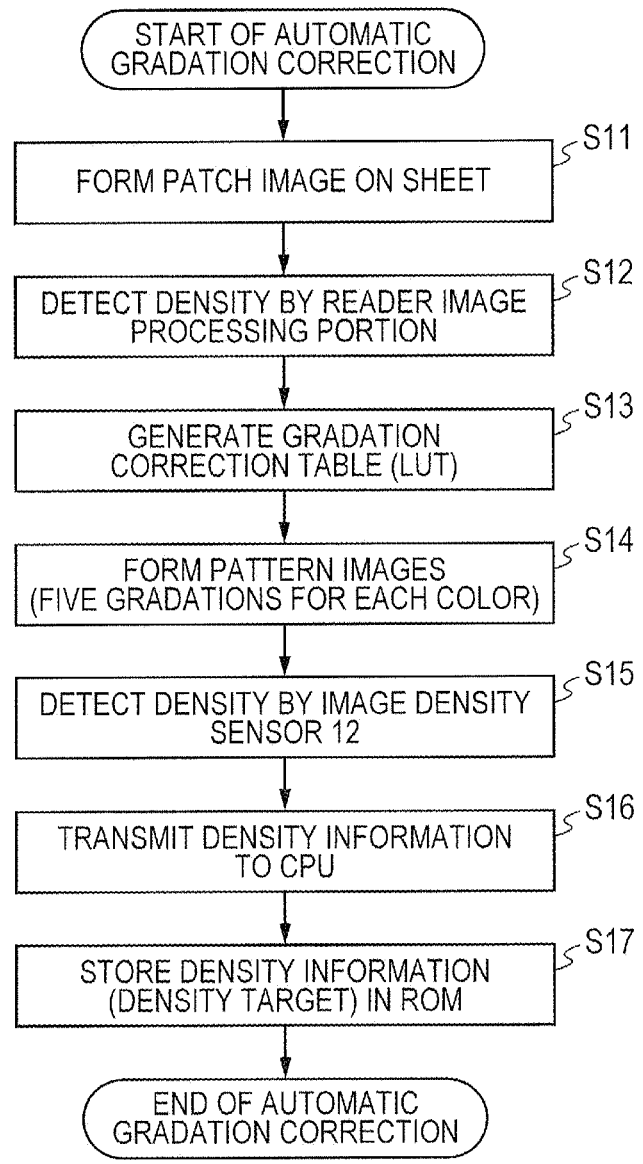
FIG. 5 is a flowchart for illustrating a control method for the image forming apparatus.

FIG. 5 is a flowchart for illustrating automatic gradation correction. The automatic gradation correction is an example of processing of obtaining a density target and is performed periodically. Further, each step is implemented when the CPU 111 executes the stored control program.

First, when the automatic gradation correction is performed, the CPU 111 causes the printer portion B to form a patch image of 64 gradations for each color on a sheet (Step S11). The number of gradations of the patch image is not limited to 64 gradations. The sheet output from the image forming apparatus 100 is set in the image reading portion A by the user and read by the image reading portion A. The density of the patch image is detected by the reader image processing portion 108 of the image reading portion A (Step S12).

Then, the CPU 111 performs interpolation processing and smoothing processing based on the density of the patch image read by the image reading portion A, to thereby obtain engine γ characteristics of the entire density region. Next, the CPU 111 generates a gradation correction table (LUT) through use of the obtained engine γ characteristics and a gradation target (ideal gradation characteristics) (Step S13).

Figure 6:
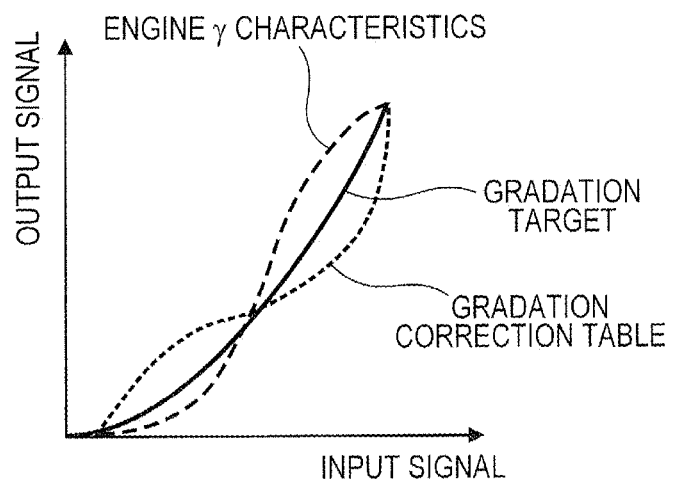
FIG. 6 is a characteristic graph for showing the operation of the image forming apparatus.

As shown in the characteristic graph of FIG. 6, the engine γ characteristics are determined based on an input signal and an output signal. The CPU 111 performs reverse converting processing so that the engine γ characteristics are matched with the gradation target to generate the gradation correction table (LUT).

When the generation processing for the gradation correction table (LUT) is completed, the density on the sheet is matched with the gradation target in the entire density region.

Next, the CPU 111 forms a plurality of pattern images through use of the above-mentioned conditions (Step S14) and detects the density of the pattern images by the image density sensor 12 (Step S15). With this, the detected density values become a target density with respect to the input signal. The image density sensor 12 transmits the detected density information to the CPU 111 (Step S16), and the density information is stored in the ROM 113 (Step S17). Thus, this processing is completed. In this case, the ROM 113 is formed of an electrically writable memory device.

Figure 7:
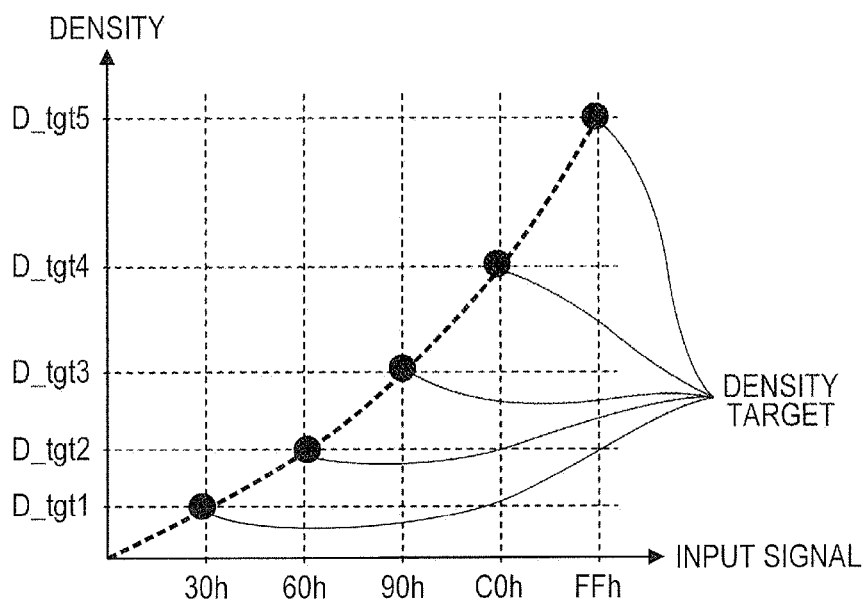
FIG. 7 is a characteristic graph for showing the operation of the image forming apparatus.

When the processing after Step S14 is performed, the pattern images of five gradations (30h, 60h, 90h, C0h, and FFh) for each color are formed after the gradation correction table (LUT) is generated in Step S13, and the density values of the pattern images are detected through use of the image density sensor 12. Then, the density targets that are the results of the detection (relationship between the density targets D_tgt1 to D_tgt5 and the image patterns, which is shown in FIG. 7) are stored in the ROM 113.

The image forming apparatus 100 is configured to form pattern images successively in a sheet-to-sheet interval area. However, when the number of sheets on which the images are to be formed is small, the LUT correction processing is not finished completely.

In view of the foregoing, the CPU 111 causes the RAM 112 to store "which pattern images have already been detected". When the subsequent copying/printing is performed, the CPU 111 resumes the LUT correction processing by starting forming pattern images again by forming a pattern image next to the pattern image stored in the RAM 112. For example, the case where the image forming portion PY is configured to form pattern images in the order of Y30h→, . . . →Y90h→YC0h→, . . . is described. When the job is completed after the image forming portion PY forms the pattern image of Y90h, the image forming portion PY forms the pattern image of YC0h between the first sheets when the next job is started.

Further, the order of forming pattern images for each color is defined as YMCK, but there is no particular limitation on the order.

FIG. 7 is a graph for schematically showing the operation of the image forming apparatus. The vertical axis represents a density, and the horizontal axis represents input signals (30h, 60h, 90h, C0h, and FFh).

Regarding the gradation patterns to be formed and number of gradations, for example, the number of pattern images in an intermediate density region may be set to be larger than the number of pattern images in other density regions (low-density region and high-density region) in order to mainly correct the intermediate density region in which a density change is large due to the engine γ characteristics shown in FIG. 6. Further, the number of pattern images in the high-density region may be set to be larger than the number of pattern images in another density region (low-density region) in order to stably output a high-density side. Further, the number of pattern images in the low-density region may be set to be higher than the number of pattern images in another density region (high-density region) in order to attach importance to the gradation characteristics on the low-density side. Further, the gradation pattern and number of gradations may be changed appropriately as necessary and are not limited to the foregoing.

[Density Correction Flow]

Next, a density correction flow will be described.

In order to shorten a correction time (adjustment time) for performing density correction (image density adjustment), the image forming apparatus 100 forms one pattern image in a sheet-to-sheet interval area between output images, and the image density sensor 12 detects the formed pattern image. Then, the image forming apparatus 100 generates a gradation correction table (LUT) based on the detection result. A method of generating the gradation correction table (LUT) will be described with reference to FIG. 8.

Figure 8:
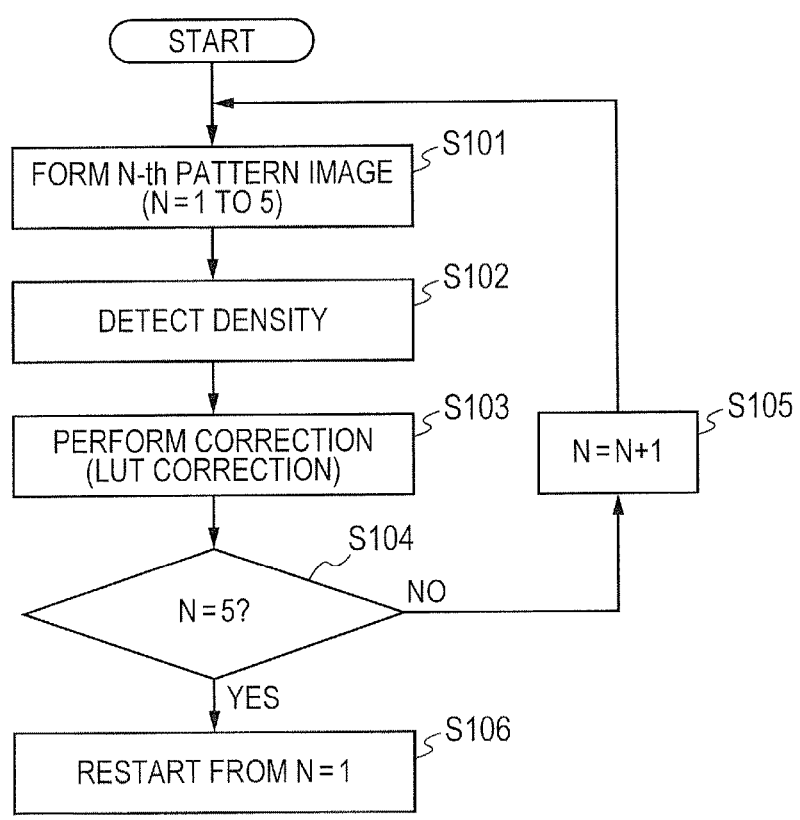
FIG. 8 is a flowchart for illustrating the control method for the image forming apparatus.

FIG. 8 is a flowchart for illustrating a control method for the image forming apparatus 100. Each step is implemented when the CPU 111 executes the control program stored in the ROM 113.

First, when a job is started, pattern images for density correction are formed in a sheet-to-sheet interval area of each image. The pattern images for density correction include pattern images of five gradations of 30h, 60h, 90h, C0h, and FFh as shown in FIG. 7. Although the order may be set arbitrarily, the accuracy of the LUT is degraded when a gradation is omitted. In the following description, the pattern images are formed successively from the low-density side or from the high-density side.

The image forming apparatus 100 forms the pattern image of the input signal 30h and then, successively forms the pattern images of 60h, 90h, C0h, and FFh in each sheet-to-sheet interval area. When the job is started, the CPU 111 forms the first (N=1) pattern image (30h) in a sheet-to-sheet interval area between an image formed on a first sheet and an image formed on a subsequent sheet (second sheet) (Step S101). The CPU 111 causes the image density sensor 12 to detect the image density of the pattern image (30h) (Step S102). The CPU 111 generates a gradation correction table (LUT) based on the detected density and previously determined target density (D_tgt1) (Step S103). The details of the method of generating the gradation correction table (LUT) will be described later.

Next, the CPU 111 determines whether or not the formed pattern image is the fifth (N=5) pattern image (Step S104). In this case, N is equal to 1. Therefore, the CPU 111 increments the value of N by 1 in Step S105 and returns to Step S101.

Then, the second (N=1+1) pattern image (60h) is formed in a sheet-to-sheet interval area between an image formed on the second sheet and an image formed on a subsequent sheet (third sheet). When the N+1th (N=(N+1)) pattern images are successively formed in sheet-to-sheet interval areas, and the fifth (N=5) pattern image (FFh) is formed, the CPU 111 causes the first (N=1) pattern image (30h) to be formed in the subsequent sheet-to-sheet interval area (Step S106).

The image forming apparatus 100 is configured to form one pattern image in each sheet-to-sheet interval area and renew the LUT. When the number of patterns to be formed in the sheet-to-sheet interval area by the image forming apparatus 100 is larger than 1 (for example, when two patterns are formed in each sheet-to-sheet interval area), it is only necessary that the pattern images be formed with the number of the pattern images being divided, the density of the pattern images be detected, and the LUT be renewed. That is, the number of the pattern images to be formed in each sheet-to-sheet interval area is not limited to the above-mentioned number.

[LUT Renewal Method]

Next, a method of renewing an LUT by the CPU 111 based on the density detected by the image density sensor 12 will be described.

First, a gradation correction table (hereinafter referred to as "initial correction LUT") is generated based on engine γ characteristics (FIG. 6) and a gradation target so that the gradation characteristics of an output image become the gradation target (hereinafter referred to as "gradation LUT"). Then, the above-mentioned density target values of five gradations for each color are obtained. After the automatic gradation correction is performed, input image data is input to the printer control portion 109 through the initial correction LUT. With this, the input image data is converted based on the gradation correction table so that the gradation characteristics of the output image become ideal gradation characteristics.

After that, the image forming apparatus 100 forms pattern images, and the pattern images are detected by the image density sensor 12. Then, a correction table (hereinafter referred to as "successive correction LUT") is successively generated based on the detection results.

[Composite Correction LUT Generation Method]

Figure 9:
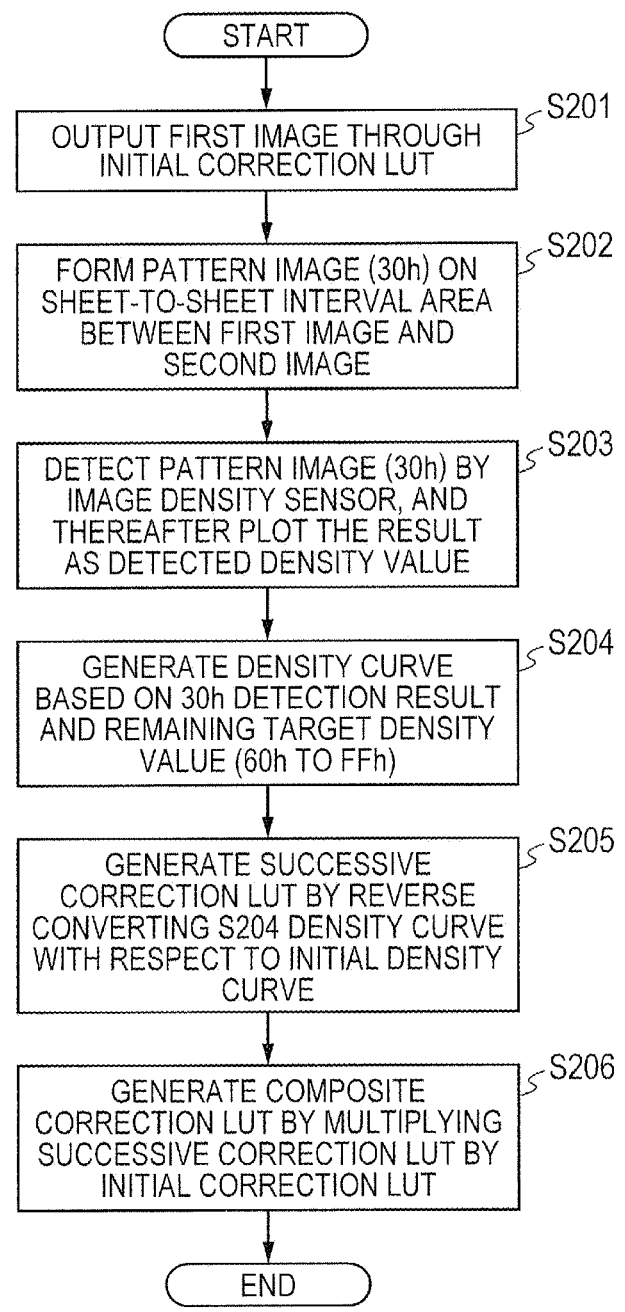
FIG. 9 is a flowchart for illustrating the control method for the image forming apparatus.
Figure 10:
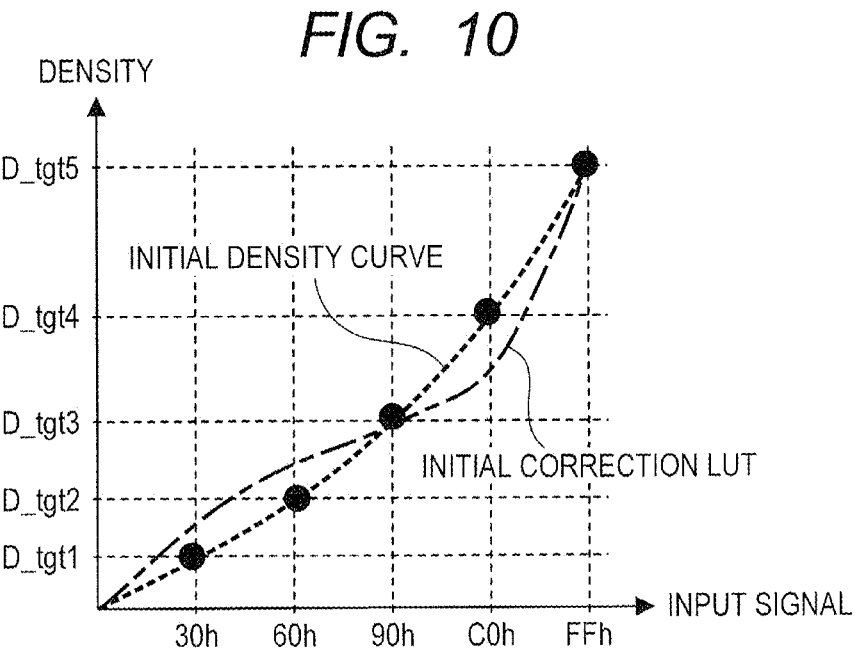
FIG. 10 is a characteristic graph for showing the operation of the image forming apparatus.

FIG. 9 is a flowchart for illustrating a control method for the image forming apparatus 100. Each step is implemented when the CPU 111 executes the stored control program.

Now, a composite correction LUT generation method of the CPU 111 will be described with reference to FIG. 9 to FIG. 12.

After the automatic gradation correction, the CPU 111 forms the first output image and the pattern image (30h) formed in a first sheet-to-sheet interval area through the initial correction LUT (FIG. 10) obtained during the automatic gradation correction (Steps S201 and S202). Next, the CPU 111 detects the pattern image (30h) formed in the first sheet-to-sheet interval area by the image density sensor 12 and plots the detection result as a detected density value of the input signal 30h (stores the detection result on the RAM 112) (Step S203).

Figure 11:
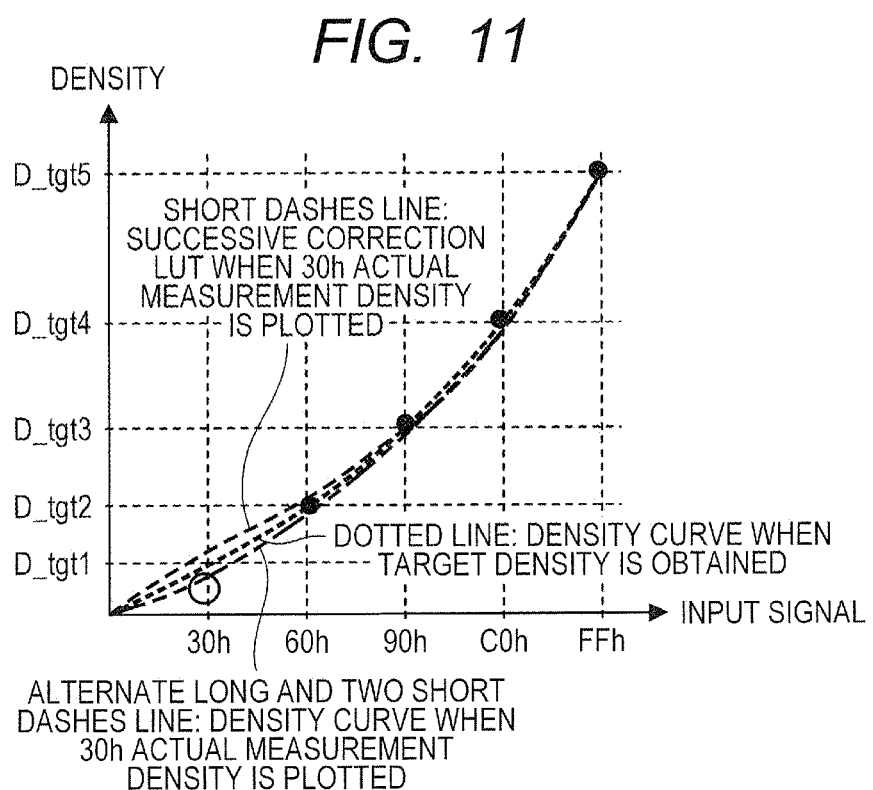
FIG. 11 is a characteristic graph for showing the operation of the image forming apparatus.

In this case, the CPU 111 newly plots the detection result in the 30h portion of the initial target density value as represented by the symbol "○" shown in FIG. 11. Herein, "plotting" means changing a density value in the correspondence relationship between the density and the input signal shown in FIG. 11. Thus, the plotted value is managed as data on the RAM 112 by the CPU 111.

Regarding the detected density values corresponding to the other pattern images (input signals 60h, 90h, C0h, and FFh), density target values immediately after the generation of the initial correction LUT are used. Then, the CPU 111 generates density characteristics data (density curve 2) represented by a curve, for example, the alternate long and two short dashes line shown in FIG. 11 through use of the density data (density curve 1) at five points, that is, the newly plotted 30h actual measurement density value and the initially measured density values 60h, 90h, C0h, and FFh (Step S204). A method of generating the density characteristics data may be an approximating method used generally, for example, an approximating method involving connecting the five points.

Figure 12:
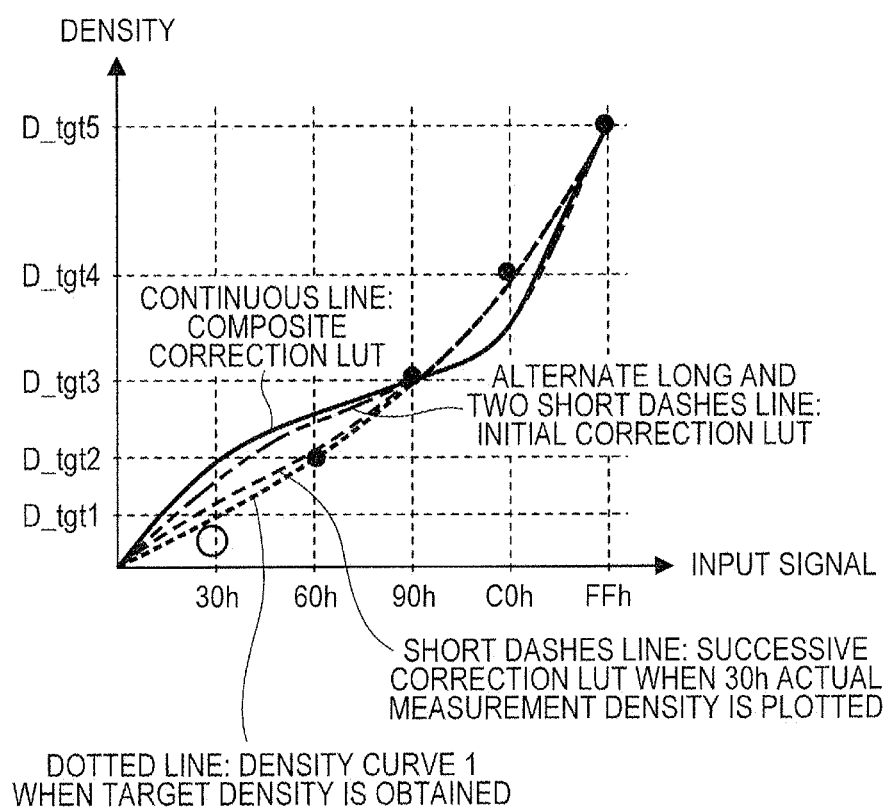
FIG. 12 is a characteristic graph for showing the operation of the image forming apparatus.

Next, the CPU 111 performs reverse converting processing in order to correct the initial density characteristics data with the density characteristics data at the time of being generated in Step S204, to thereby generate a successive correction LUT as represented by the short dashes line shown in FIG. 12 (Step S205).

Finally, the CPU 111 generates a composite correction LUT as represented by the continuous line of FIG. 12 by multiplying the successive correction LUT by the initial correction LUT and stores the composite correction LUT in the RAM 112 (Step S206). Then, the CPU 111 reflects the composite correction LUT in an output image. After the composite correction LUT is reflected in the output image, the output image and a pattern image (gradation pattern) for density correction in the subsequent sheet-to-sheet interval area are output in a state of being multiplied by the composite correction LUT.

Figure 13:
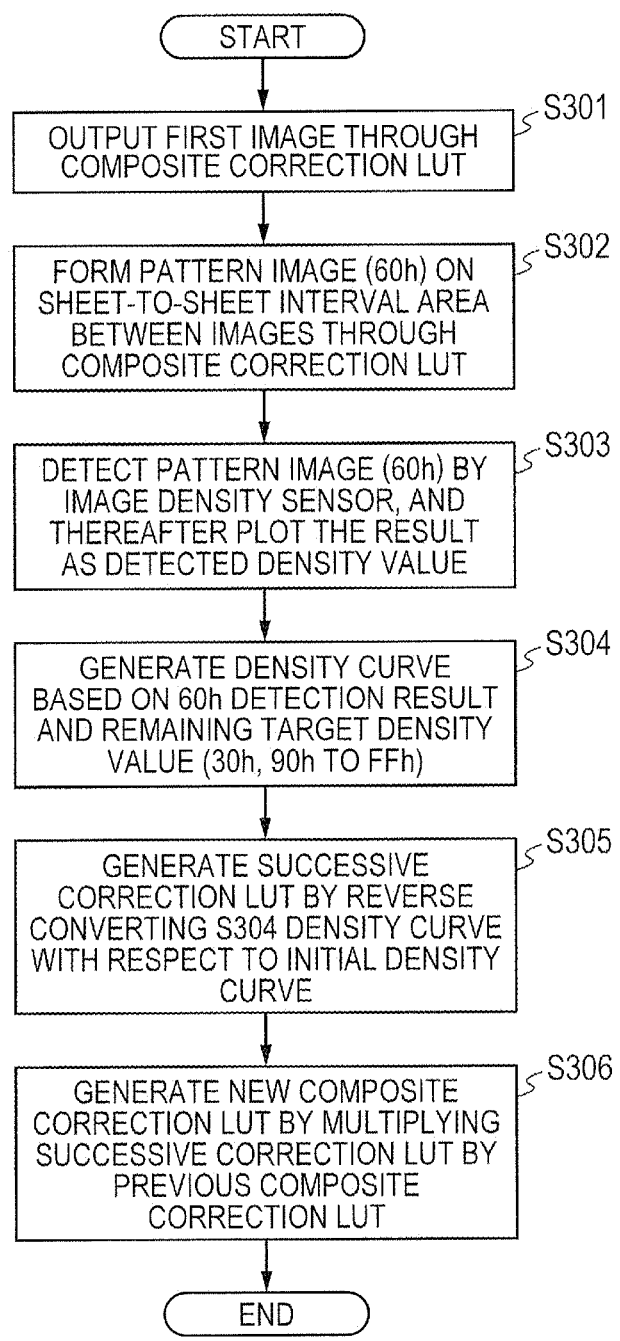
FIG. 13 is a flowchart for illustrating the control method for the image forming apparatus.

FIG. 13 is a flowchart for illustrating a control method for the image forming apparatus 100. Each step is implemented when the CPU 111 executes the stored control program. Now, the processing executed by the CPU 111, specifically, subsequent image output processing after the composite correction LUT is generated and reflected is described with reference to FIG. 13 to FIG. 16.

Figure 14:
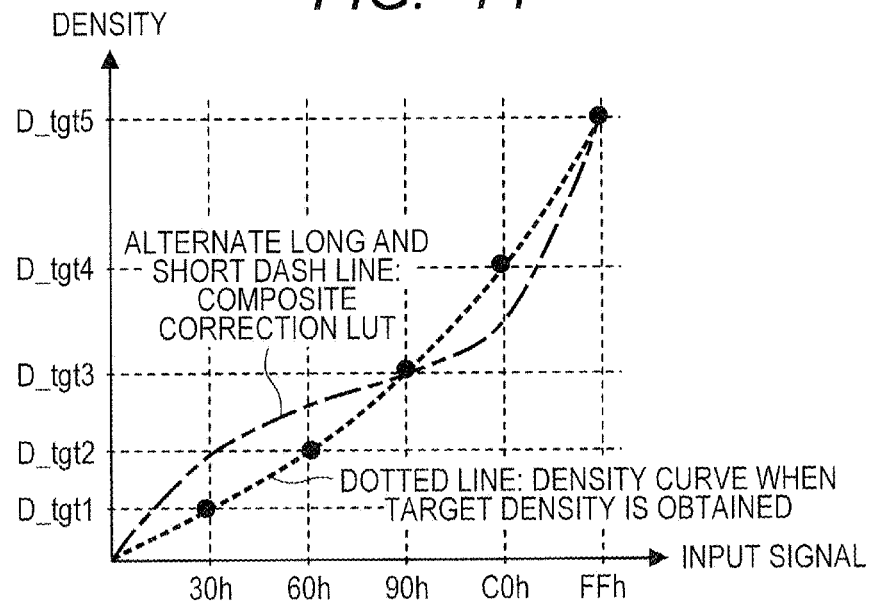
FIG. 14 is a characteristic graph for showing the operation of the image forming apparatus.

First, the CPU 111 generates an output image after the composite correction LUT shown in FIG. 12 is stored in the RAM 112 and reflected and a pattern image (input signal 60h) formed in a subsequent sheet-to-sheet interval area through the composite correction LUT obtained during the previous density correction shown in FIG. 14 (Steps S301 and S302). Then, the CPU 111 detects the pattern image (60h) by the image density sensor 12, and plots the detection result as a detected density value of the input signal 60h (stores the detection result in the RAM 112) (Step S303). The CPU 111 newly plots the detection result in the 60h portion of the initial target density value as represented by the symbol "○" shown in FIG. 15. Regarding the detected density corresponding to the other input signals (30h, 90h, C0h, and FFh), the density target values immediately after the generation of the initial correction LUT are used. In this case, also immediately after the generation of the composite correction LUT, the density target values immediately after the generation of the initial correction LUT are used during the generation of a density curve.

In this case, the composite correction LUT is generated after the 30h actual measurement value has been plotted as described above, but the composite correction LUT is configured to correct the LUT so that a shift portion of the detected density is matched with the initial target density curve.

Thus, outputting an image through the composite correction LUT means that the density characteristics of an engine are corrected so as to be matched with the initial target density curve 1 through the composite correction LUT after the density is detected in a state of being shifted from the target density.

Figure 15:
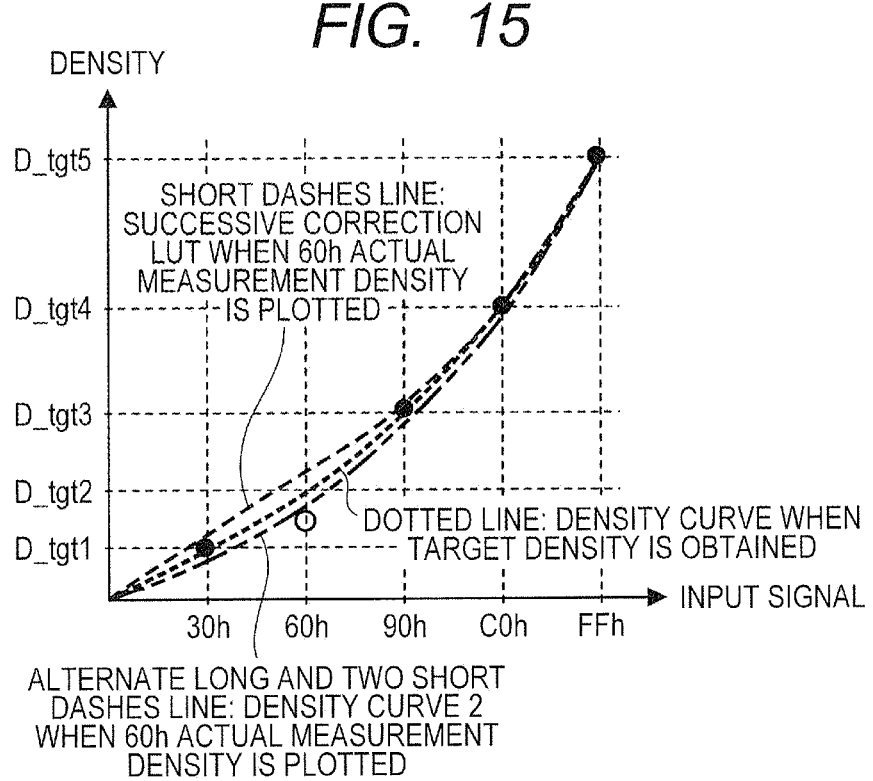
FIG. 15 is a characteristic graph for showing the operation of the image forming apparatus.

Next, the CPU 111 generates the density curve 2, for example, the alternate long and two short dashes line shown in FIG. 15 through use of five points, that is, an actual measurement density value corresponding to the input signal 60h that is newly plotted and the target densities corresponding to the input signals values 30h, 90h, C0h, and FFh (Step S304). A method of generating the density curve 2 may be an approximating method used generally, for example, an approximating method involving connecting the five points.

Next, the CPU 111 performs reverse converting processing so that the density curve 2 becomes an ideal density curve at the time of being generated in Step S304, to thereby generate a successive correction LUT as represented by the short dashes line shown in FIG. 15 (Step S305).

Figure 16:
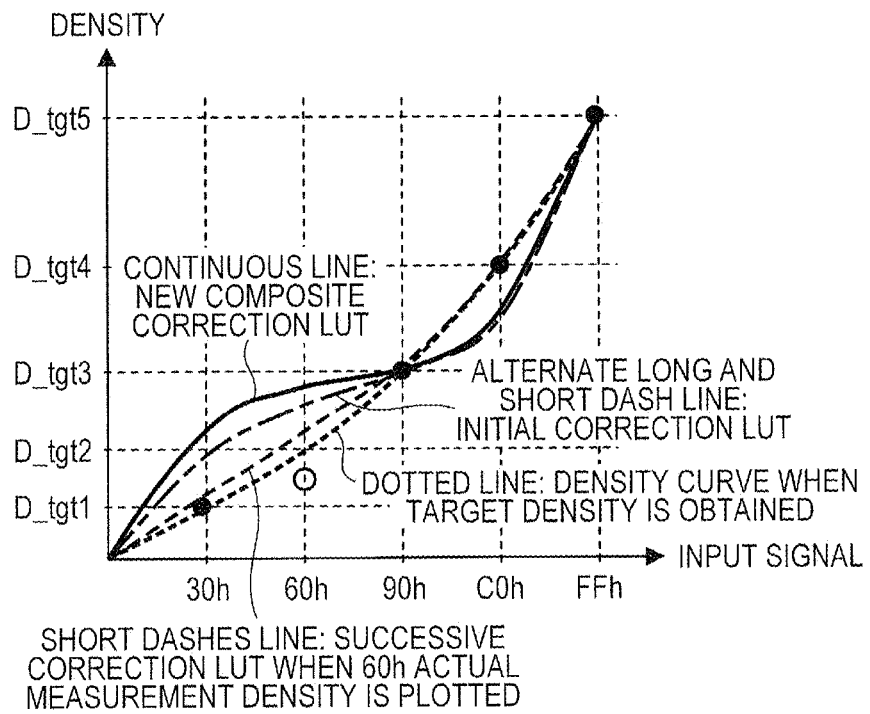
FIG. 16 is a characteristic graph for showing the operation of the image forming apparatus.

Finally, the CPU 111 multiplies the newly generated successive correction LUT by the previously calculated composite correction LUT to generate a new composite correction LUT as represented by the continuous line of FIG. 16 and stores the new composite correction LUT in the RAM 112 (Step S306). The image forming apparatus 100 is configured to form an output image by converting an image signal through the newest composite correction LUT stored in the RAM 112.

The successive correction LUT and the composite correction LUT as described above are successively renewed every time a pattern image is detected. When this flow is successively performed in each sheet-to-sheet interval area, an image can be output stably.

The reflection of the composite correction LUT is influenced by the speed of the image forming apparatus, the processing speed of the controller, and the like, and hence the output image is not limited to an output image immediately after a pattern image is formed in a sheet-to-sheet interval area.

Further, the image forming apparatus 100 may have a configuration in which a pattern image is formed based on one input signal value every time a plurality of pages of images are formed. Alternatively, the image forming apparatus 100 may have a configuration in which two pattern images are formed based on two input signal values every time a plurality of pages of images are formed. The pattern image formed in one sheet-to-sheet interval area may be formed based on a plurality of image signal values.

[Verification of Effects]

Next, the effects of the configuration described in the first embodiment will be described. A comparison is made regarding a method of Comparative Example 1 involving forming pattern images of all gradations in each sheet-to-sheet interval area, detecting densities of the pattern images, and generating an LUT and a method of Comparative Example 2 involving forming one pattern image in each sheet-to-sheet interval area, detecting densities of the pattern images of all gradations, and then generating an LUT.

First, a toner having a density of 1.6 in an amount of 0.5 mg/cm$^2$ at a time when an input signal value was 255 was used. Further, each pattern image was formed so as to have dimensions of 15-mm square (2.25 cm$^2$). Further, as a density accuracy verification method, images of 40h, 80h, and D0h were formed on an output image itself, and the density of the output image before and after the LUT renewal was measured.

Figure 17:
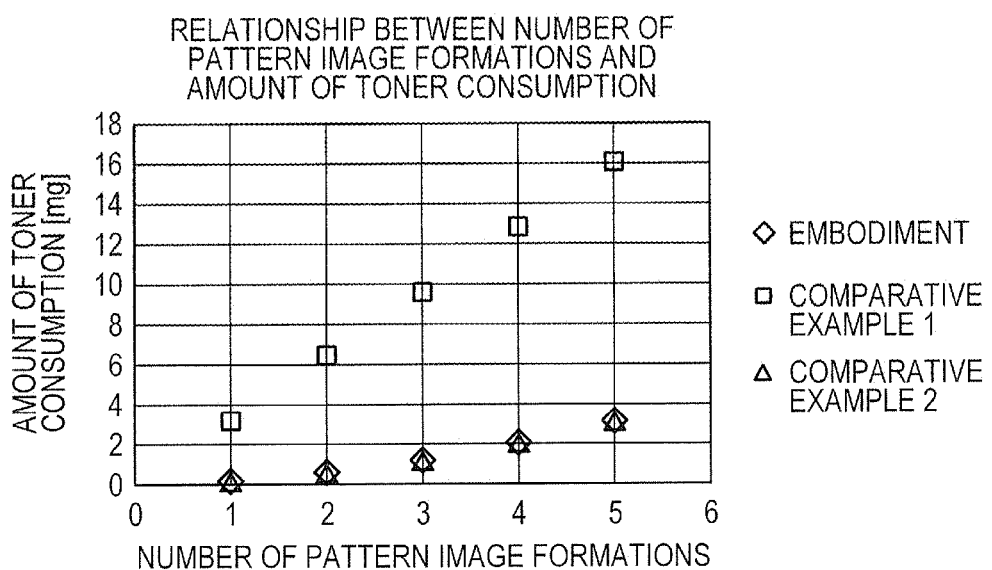
FIG. 17 is a characteristic graph for showing the operation of the image forming apparatus.

FIG. 17 is a graph for showing a relationship between the number of pattern image formations and the amount of toner consumption.

In FIG. 17, in the configuration described in the first embodiment, pattern images of five gradations required at a time of calculating a density curve for generating a correction LUT are each formed separately in each sheet-to-sheet interval area, to thereby be corrected. Thus, it is understood that the amount of a toner to be used for image density correction is suppressed. Further, Comparative Example 2 is also a system involving forming one pattern image in each sheet-to-sheet interval area, and hence the amount of toner consumption is suppressed.

Meanwhile, in Comparative Example 1, pattern images of five gradations required at a time of calculating a density curve are all formed in one sheet-to-sheet interval area. Thus, the amount of a toner that is five times that of the first embodiment and Comparative Example 2 is required for image density correction. In order to form pattern images of all gradations, a sheet-to-sheet interval area having a considerable length is required, and the productivity is decreased in the case of a high-speed device and the like.

Next, the number of pattern image formations and the change amount of density before and after the LUT renewal will be described with reference to FIG. 18 regarding the case using the first embodiment and the case using Comparative Example 2.

Figure 18:
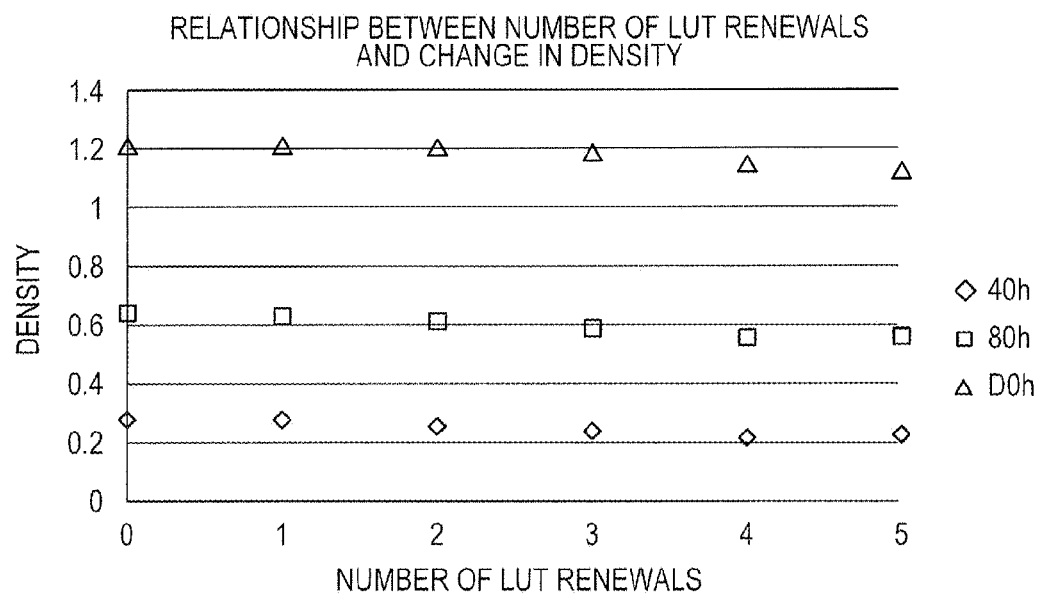
FIG. 18 is a characteristic graph for showing the operation of the image forming apparatus.

FIG. 18 is a graph for showing a change in density of a verification pattern for each LUT renewal in the case where the LUT is renewed by using the method of the first embodiment as a density verification method. Further, in Comparative Example 2, when the LUT is renewed, the density value at a time of the number of LUT renewals of 0 in FIG. 18 changes to the density value at a time of the number of LUT renewals of 5. The reason for this is as follows. A pattern image for density correction is formed separately in a sheet-to-sheet interval area, and the density thereof is detected. In this case, each pattern output value is not renewed successively, and instead, all the pattern output values of five gradations are renewed.

Now, each number of renewals and the difference in density before and after the renewal are shown in Table 1.

TABLE 1

| Δ density | First Embodiment | | | | | | Comparative |
|---|---|---|---|---|---|---|---|
| (pre-job) | 1 | 2 | 3 | 4 | 5 | Average | Example |
| 40 h | 0.010 | 0.014 | 0.019 | 0.020 | 0.009 | 0.014 | 0.052 |
| 80 h | 0.011 | 0.017 | 0.025 | 0.032 | 0.004 | 0.018 | 0.082 |
| D0 h | 0.003 | 0.007 | 0.015 | 0.038 | 0.024 | 0.018 | 0.088 |
| Average | 0.008 | 0.013 | 0.019 | 0.030 | 0.012 | 0.017 | 0.074 |

As is understood from Table 1, when the LUT renewal method of the first embodiment is used, during five LUT renewals, the density changes by 0.38 at most in the D0h pattern image and by only about 0.017 on the average of all three kinds of pattern images before and after the LUT renewal.

Meanwhile, it is understood that, when the LUT is renewed after all the five gradations are obtained, the density changes by 0.88 in the D0h pattern image and by about 0.074 on the average of all three kinds of pattern images before and after the LUT renewal.

Through use of the configuration of the first embodiment, before and after calibration for hue and density gradation characteristics stabilization control is performed, the abrupt variations of hue and density of an output image can be appropriately prevented, and at the same time, the amount of a toner required for the calibration can be suppressed.

According to the first embodiment, gradation characteristics can be properly corrected while the amount of a toner required for forming a pattern image for density correction is suppressed.

Second Embodiment

In the first embodiment, description is made of the method involving forming a pattern image for density correction between general output images (in a sheet-to-sheet interval area), detecting the density of the pattern image by the image density sensor 12 in a state in which the pattern image is not fixed, and generating a correction LUT for correcting a shift from a density target.

In a second embodiment of the present invention, description is made of a method involving forming a pattern image for density correction in a margin space or a region outside of a register mark of an output image, detecting the image density after the pattern image is fixed by a post-fixing color sensor 122, and generating a correction LUT for correcting a shift from a density target.

The configurations of the image forming apparatus and the exposure device, and the gradation correction method of image density control in the second embodiment are the same as those of the first embodiment, and hence description thereof is omitted.

<Image Density Sensor>

Figure 19:
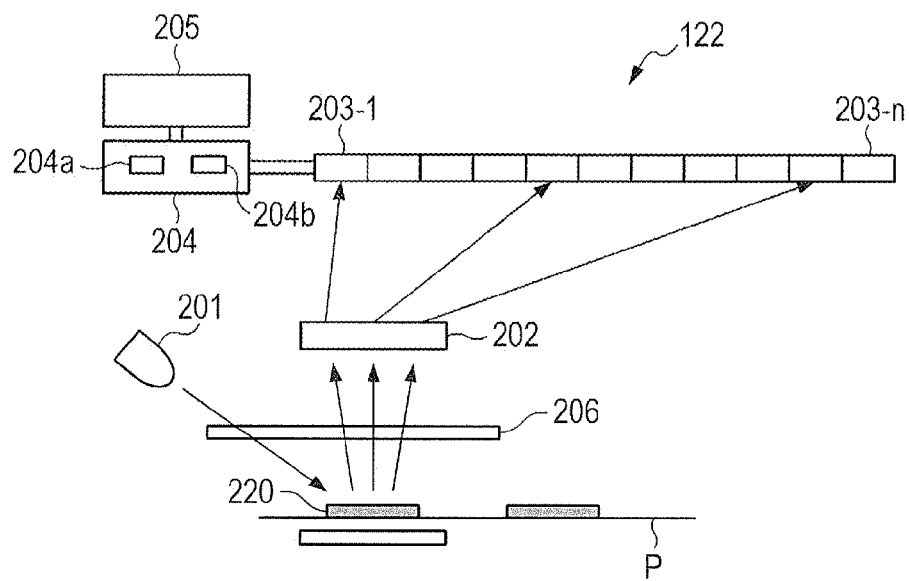
FIG. 19 is a view for illustrating detection processing for a pattern image for density correction of the image forming apparatus.

FIG. 19 is a view for illustrating a configuration of the post-fixing color sensor 122 of the image forming apparatus according to the second embodiment.

In FIG. 19, the post-fixing color sensor 122 may use, for example, three or more kinds of light sources having different emission spectra of red (R), green (G), blue (B), and the like as light emitting elements. Alternatively, a light source configured to emit white (W) light may be used as the light emitting element, and three or more kinds of filters having different spectral transmittances of red (R), green (G), blue (B), and the like may be formed on a light receiving element. The post-fixing color sensor 122 may be a sensor capable of obtaining three or more different kinds of outputs such as RGB outputs or a color sensor configured to irradiate a pattern image with light by a light emitting diode (LED), dispersing the reflected light for each wavelength by a diffraction grating, and outputting a signal value as a spectral reflectance. In the second embodiment, a method of correcting an image density through use of a spectral color sensor will be described.

In FIG. 19, the post-fixing color sensor 122 includes a white LED 201 configured to irradiate a pattern image (toner patch) 220 on a sheet P with light and a diffraction grating 202 configured to disperse light reflected from the pattern image 220 for each wavelength. The post-fixing color sensor 122 further includes line sensors 203 (203-1 to 203-$n$) formed of n pixels configured to detect light decomposed for each wavelength by the diffraction grating 202. The post-fixing color sensor 122 further includes a calculating portion 204 configured to perform various calculations based on a light intensity value of each pixel detected by the line sensors 203 and a memory 205 configured to store various data. The calculating portion 204 includes, for example, a density calculating portion 204$a$ configured to calculate a density based on a light intensity value and a Lab calculating portion 204$b$ configured to calculate a Lab value.

Further, the post-fixing color sensor 122 may include a lens 206 configured to converge light output from the white LED 201 onto the pattern image 220 on the sheet P and converge light reflected from the pattern image 220 onto the diffraction grating 202.

<Formation Position of Pattern Image for Density Correction>

Figure 20:
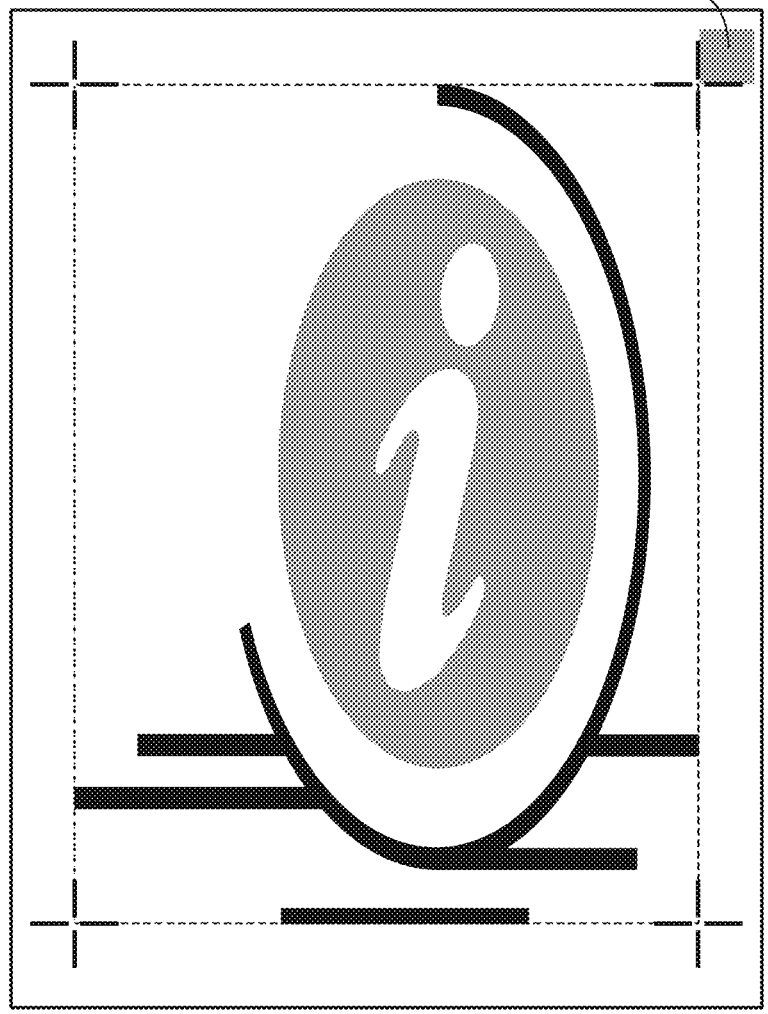
FIG. 20 is a view for illustrating an example of an image forming position of the pattern image for density correction.

FIG. 20 is a view for illustrating an example of a formation position of a pattern image for density correction in the second embodiment. The formation position of the pattern image is an example, and the present invention is not limited thereto.

In FIG. 20, the dotted line represents an image formation region of an output image. The alternate long and short dash lines arranged at four corners of the image formation region represent register mark positions, and a printed sheet is cut at the register marks to provide a finished product. A pattern image for density correction is formed on the upper right side of a region outside of the register mark.

Further, the post-fixing color sensor 122 is arranged at an opposing position so as to be able to detect the pattern image for density correction.

Through use of the configuration as described above, variations of hue and density can be suppressed, and at the same time, the amount of a toner required for the calibration can be suppressed, also in the calibration method using a margin space or a region outside of a register mark of an output image.

More specifically, before and after the calibration for hue and density gradation characteristics stabilization control is performed, a part of data on a plurality of previously determined gradation patterns required for understanding the gradation characteristics of an engine during operation is obtained. Then, at this stage, a look-up table is changed, and feedback is successively given to the image forming condition. With this, the abrupt variations of hue and density of an output image can be appropriately prevented, and at the same time, the amount of a toner required for the calibration can be suppressed.

According to the second embodiment, gradation characteristics can be properly corrected while the amount of a toner required for forming a pattern image for density correction is suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091212, filed Apr. 28, 2016, which is hereby incorporated by reference herein in its entirety.

What is claimed is:

1. An image forming apparatus, comprising:
a converting unit configured to convert image data based on a conversion condition;
an image forming unit configured to form an image based on the converted image data;
a measurement unit configured to measure a plurality of measurement images which are formed by the image forming unit based on measurement image data; and
a controller configured to control the image forming unit to form the plurality of measurement images, control the measurement unit to measure the plurality of measurement images, obtain output characteristics of the image forming unit based on measurement results of the plurality of measurement images, and generate the conversion condition based on the output characteristics,
wherein the plurality of measurement images include a first measurement image and a second measurement image different from the first measurement image,
wherein the controller controls the image forming unit to form the first measurement image again, controls the measurement unit to measure the first measurement image, obtains first output characteristics based on a current measurement result of the first measurement image and a previous measurement result of the second measurement image, and generates the conversion condition based on the first output characteristics, and
wherein the controller controls the image forming unit to form the second measurement image again, controls the measurement unit to measure the second measurement image, obtains second output characteristics based on a current measurement result of the second measurement image and a previous measurement result of the first measurement image, and generates the conversion condition based on the second output characteristics.

2. An image forming apparatus according to claim 1, wherein the controller controls the image forming unit to form the first measurement image again while the image forming unit continuously forms a plurality of images, and
wherein the controller controls the image forming unit to form the second measurement image again while the image forming unit continuously forms the plurality of images.

3. An image forming apparatus according to claim 1, wherein a first period from when the first measurement image is formed again to when the conversion condition is generated based on the current measurement result of the first measurement image and the previous measurement result of the second measurement image is different from a second period from when the second measurement image is formed again to when the conversion condition is generated based on the current measurement result of the second measurement image and the previous measurement result of the first measurement image.

4. An image forming apparatus according to claim 1, wherein the image forming unit forms the first measurement image based on first measurement image data, and
wherein the image forming unit forms the second measurement image based on second measurement image data different from the first measurement image data.

5. An image forming apparatus according to claim 1, wherein the plurality of measurement images include a third measurement image different from the first measurement image and the second measurement image, and
wherein the controller controls the image forming unit to form the third measurement image again, controls the measurement unit to measure the third measurement image, obtains third output characteristics based on a current measurement result of the third measurement image, the previous measurement result of the first measurement image, and the previous measurement result of the second measurement image, and generates the conversion condition based on the third output characteristics.

6. An image forming apparatus according to claim 1, wherein the image forming unit forms the image on a sheet,
wherein the measurement unit measures the plurality of measurement images formed on an image bearing member by the image forming unit, wherein the controller further controls the image forming unit to form a test image on a sheet, obtains read data of the test image output from a reading device, and generates the conversion condition based on the read data, and wherein after the conversion condition is generated based on the read data, the controller controls the image forming unit to form the plurality of measurement images, controls the measurement unit to measure the plurality of measurement images, and stores the measurement results of the plurality of measurement images.

7. An image forming apparatus according to claim 1, wherein the conversion condition corresponds to a gradation correction table for correcting the output characteristics of the image to be formed by the image forming unit.

\* \* \* \* \*